US 6,683,823 B2

(12) United States Patent
Saga et al.

(10) Patent No.: US 6,683,823 B2
(45) Date of Patent: Jan. 27, 2004

(54) METHOD FOR REPRODUCING INFORMATION ON A RECORDING MEDIUM

(75) Inventors: Hideki Saga, Kokubunji (JP); Hiroaki Nemoto, Kokubunji (JP); Hirofumi Sukeda, Tokorozawa (JP); Masahiko Takahashi, Uenohara (JP); Kimio Nakamura, Kokubunji (JP); Yohji Maruyama, Iruma (JP); Hiroshi Ide, Kodaira (JP); Takehiko Hamaguchi, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/320,517

(22) Filed: Dec. 17, 2002

(65) Prior Publication Data

US 2003/0123333 A1 Jul. 3, 2003

Related U.S. Application Data

(63) Continuation of application No. 09/719,427, filed as application No. PCT/JP98/03929 on Sep. 2, 1998, now Pat. No. 6,560,168.

(51) Int. Cl.[7] .................................................. G11B 7/00
(52) U.S. Cl. ............................ 369/13.05; 369/13.15; 369/47.1
(58) Field of Search ........................... 369/13.05, 47.1, 369/53.1, 53.76, 53.37, 59.1, 126, 13.15; 360/110, 111, 314, 328, 114.01, 115

(56) References Cited

U.S. PATENT DOCUMENTS

| 5,636,187 | A | * | 6/1997 | Fujii ........................ 369/13.15 |
| 5,687,141 | A | * | 11/1997 | Ishii ........................ 369/13.15 |
| 6,178,142 | B1 | * | 1/2001 | Fujita ........................ 369/13.15 |
| 6,333,827 | B1 | | 12/2001 | Hamamoto et al. |
| 6,396,774 | B1 | | 5/2002 | Matsumoto et al. |

FOREIGN PATENT DOCUMENTS

| JP | 4-48424 | 2/1992 |
| JP | 5-54422 | 3/1993 |
| JP | 5-298737 | 11/1993 |
| JP | 7-244801 | 9/1995 |
| JP | 8-212579 | 8/1996 |
| JP | 8-248641 | 9/1996 |
| JP | 10-21598 | 1/1998 |

OTHER PUBLICATIONS

Japanese literature "Optical Disk Technique", 1989, Radio Technique Corporation, pp. 85–97.

* cited by examiner

Primary Examiner—Muhammad Edun
(74) Attorney, Agent, or Firm—Antonelli, Terry, Stout & Kraus, LLP

(57) ABSTRACT

A method for reproducing information on a recording medium includes irradiating electromagnetic energy or light to the recording medium from one side with respect to the recording medium, applying a recording magnetic field to an electromagnetic energy or light irradiated position on the recording medium from the one side of irradiating electromagnetic energy or light, and detecting magnetic leakage flux emerging from the recording medium from the one side of irradiating electromagnetic energy or light.

3 Claims, 10 Drawing Sheets

METHOD FOR REPRODUCING INFORMATION ON A RECORDING MEDIUM

This application is a Continuation application of application Ser. No. 09/719,427 filed Dec. 12, 2000, U.S. Pat. No. 6,560,168 which is a 371 of PCT/JP98/03929 filed Sep. 2, 1998 the contents of which are incorporated herein by reference in their entirety.

TECHNICAL FIELD

The present invention relates to an information reproducing apparatus using a recording medium which holds information by using reversed magnetic domains on a vertical magnetic recording film formed on a substrate surface, and reproducing information by detecting magnetic leakage flux emerging from the recording medium. Or the present invention relates to an information recording apparatus using a recording medium which holds information by using a reversed magnetic domain on a vertical magnetic recording film formed on a substrate surface, recording information by forming reversed magnetic domains, and reproducing information by detecting magnetic leakage flux emerging from the recording medium.

BACKGROUND ART

In a conventional information recording medium and its recording apparatus (prior art) capable of conducting both optical magnetic reproduction and magnetic reproduction as described in JP-A-10-21598, recording was conducted by applying recording light from a light source to an optical magnetic recording film formed on a recording medium, through a substrate, thereby heating the optical magnetic recording film, and forming a reversed magnetic domain. Furthermore, information reproduction was conducted by applying reproducing light from the light source to the above described optical magnetic recording film through the substrate and detecting rotation of polarization plane of reflected light, and forming a second magnetic layer on the optical magnetic recording film and conducting leakage flux reproduction from the second magnetic layer.

DISCLOSURE OF INVENTION

In the conventional technique, the light source was disposed across the substrate from the recording film. As a result, it was impossible to form recording films on both surfaces of the substrate and conduct recording. Furthermore, since the substrate must have transparency with respect to the wavelength of the light source, the degree of freedom with regard to the material of the substrate was low and a thin inexpensive substrate having an excellent mechanical property could not be used. In addition, it was necessary to separately prepare means for positioning a recording means and a reproducing means in arbitrary positions on the recording medium. Therefore, there were disadvantages as regards apparatus size, cost, and recording medium cost.

Furthermore, the tolerance was narrow as regards the thickness error of the substrate and the error of the angle formed between the substrate and the optical axis. It was thus necessary to keep high mechanical precision of the information recording apparatus and recording medium. This resulted in a disadvantage with regard to the apparatus fabrication cost.

In order to solve the above described problem, the present invention provides an information recording apparatus using a recording medium which holds information by means of reversed magnetic domains on a perpendicular magnetic recording film, the information recording apparatus including:

an irradiation means for applying electromagnetic energy or light to the recording medium; and a magnetic flux detection means for detecting magnetic leakage flux emerging from the recording medium, the magnetic flux detection means being disposed on the same side as the irradiation means with respect to the recording medium.

As a result, double-sided-recording on the recording medium can be conducted. In other words, data simply twice as much as data of the conventional technique can be recorded. Although electromagnetic energy or light is applied here, any one may be used so long as it locally excites the recording medium by focusing with, for example, a lens. As examples of electromagnetic energy or light, there are infrared light, ultraviolet light, and so on besides visible light.

Furthermore, the information recording apparatus further includes a slider for scanning the recording medium surface with at least a part of the irradiation means and the magnetic flux detection means being mounted on the slider. It has thus become possible to simultaneously adjust the irradiation position and the magnetic flux detection position.

Furthermore, at least a part of the irradiation means of the slider is disposed ahead of the magnetic flux detection means in the scanning direction. It has thus become possible to dispose the irradiation means which may have a somewhat large flying height ahead of the magnetic flux detection means, and dispose the magnetic flux detection means desired to have a reduced flying height nearer the recording medium.

Furthermore, a SIL as at least a part of the irradiation means is mounted on the slider. Thus the slider is disposed closer to the recording film, and magnetic flux detection has been facilitated. Furthermore, owing to the SIL, it has become possible to form minuter record marks with the same light source wavelength.

Furthermore, an objective lens as at least a part of the irradiation means is mounted on the slider. The irradiation position is made movable simultaneously so as to correspond to the magnetic flux detection position.

Furthermore, an optical fiber as at least a part of the irradiation means is mounted on the slider. It has been attempted to reduce the weight of the irradiation means, and access performance has been improved.

Furthermore, a lens actuator for adjusting the position of the objective lens is mounted on the slider. It has thus been made possible to adjust the relative position of the objective lens with respect to a magnetic flux detection device finely.

As for this adjustment, it can be also be conducted by mounting an actuator for adjusting the relative position relation between a focused position of the electromagnetic energy or light on the recording medium and the magnetic flux detection means.

Furthermore, the information recording apparatus includes a recording magnetic field applying means for applying a recording magnetic field to the focused position of the electromagnetic energy or light on the recording medium. Since the size of the record mark is determined by the size of the spot irrespective of the magnetic field application range by the magnetic field applying means, the size of the mark is considerably small. As for the magnetic field direction at this time, the recording density is larger in a direction perpendicular to a main surface of the recording medium than in a longitudinal direction.

In the present invention, light can be used exclusively for recording, and consequently polarization direction detection in conventional magneto-optical reproduction becomes unnecessary. By using a polarization beam splitter having a transmission factor from the light source to the recording medium equivalent to almost 100% and a reflection factor equivalent to almost 0%, therefore, the utilization efficiency of light can be made higher.

Furthermore, another aspect of the present invention provides an information recording apparatus including a light irradiation position control means for controlling a light irradiation position by using reflected light from an embossed structure portion provided on a surface of a recording medium, and a magnetic flux detection position control means for detecting magnetic leakage flux in the embossed structure portion and controlling a position of magnetic flux detection. Therefore, the embossed structure can be used in common for position control of both light irradiation position and magnetic flux detection position.

Furthermore, as another aspect of the invention, an crescent-shaped magnetic domain is formed in magneto-optical recording of a magnetic field modulation method. Therefore, highly efficient reproduction has been realized by providing a magnetic flux detection means having substantially arc-shaped magnetic flux detection sensitivity distribution along the recording medium surface.

By the way, as a secondary effect, it becomes unnecessary for the substrate of the recording medium to have transparency with regard to the wavelength of the light source. Accordingly, the degree of freedom with regard to the substrate material becomes high. It thus becomes possible to use a thin inexpensive substrate having an excellent mechanical property. As a result, there are extreme advantages as regards apparatus size and recording medium cost.

Furthermore, since the focusing route of energy does not pass through the substrate, the problem of the thickness error of the substrate is solved, and simultaneously therewith the tolerance with regard to the error of the angle formed between the substrate and the optical axis is widened. Therefore, the mechanical precision of the information recording apparatus and the recording medium can be relaxed, and there are extreme advantages as regards the apparatus fabrication cost.

BEST MODE FOR CARRYING OUT THE INVENTION

Figure 1:
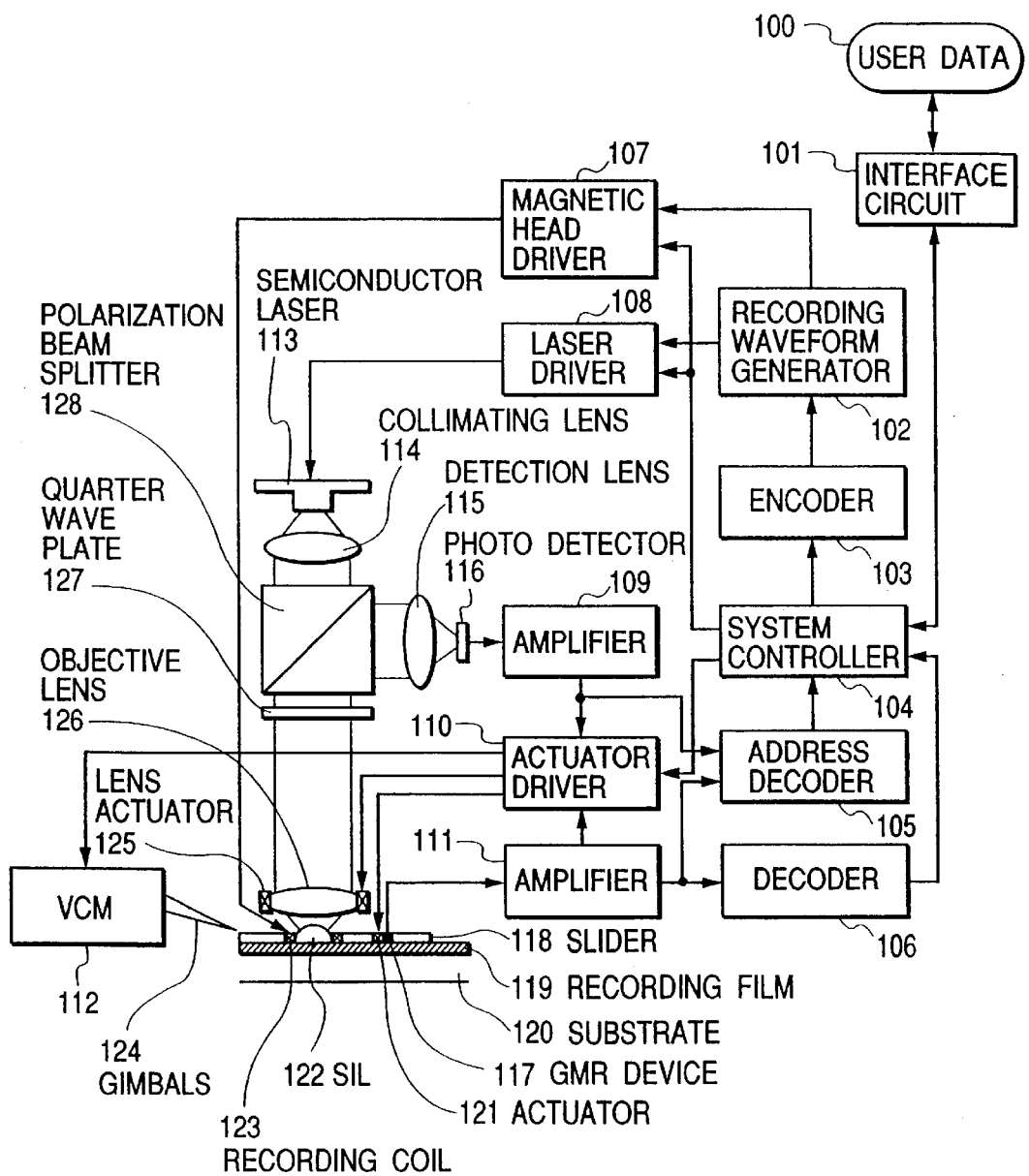
FIG. 1 is a first diagram showing an example of a configuration of an information recording apparatus according to the present invention.

Hereafter, a concrete embodiment of the present invention will be described in detail by referring to the drawing.

Numerals in the drawing are listed below.
107, 311 magnetic head driver circuit
108, 307 laser driver circuit
110, 309, 916 actuator driver circuit
112, 326, 914 VCM
113, 312 semiconductor laser
116, 315, 912 photo detector
117, 317, 902 GMR device
118, 327, 907 slider
121, 321 actuator
122, 905 SIL
123, 320, 906 recording coil
126, 908 objective lens
127, 324, 909 quarter wave plate
128, 325, 910 polarization beam splitter
316 optical fiber
500, 704 groove
501, 705 land
507 pit
700 address pit
801 crescent-shaped GMR device
901 perpendicular magnetic recording film
903 lens actuator FIG. 1 is a first diagram showing an example of a configuration of an information recording apparatus according to the present invention. Acquisition of recording or reproducing position information conducted in parallel with recording or reproducing operation is conducted as described below. Laser light emitted from a semiconductor laser 113 is converted to collimated light by a collimating lens 114. The collimated light passes through a polarization beam splitter 128, and converted to circularly polarized light by a quarter wave plate 127. It is now assumed that the polarization beam splitter 128 totally transmits polarized light of laser light emitted from the semiconductor laser 113. Furthermore, the emitted light is focused on a recording film 119, which is formed on a substrate 120, in a state of circularly polarized light by an objective lens 126 and a SIL (Solid Immersion Lens) 122. An optical spot (not illustrated) is thus formed. By using the SIL, the optical spot diameter is reduced by a value corresponding to the refractive index of the SIL as compared with the case where the SIL is not used. It is now assumed that the intensity of laser light emitted from the semiconductor laser 113 is sufficiently low to such a degree as not to destroy a record mark (reversed magnetic domain, not illustrated) on the recording film 119. Subsequently, reflected light from the recording film 119 passes through the SIL 122 and the objective lens 126, and it is then converted by the quarter wave plate 127 to linearly polarized light which is perpendicular to laser light emitted from the semiconductor laser 113. Furthermore, this reflected light is totally reflected by the polarization beam splitter 128, and focused on a photo detector 116 by a detection lens 115. Therefore, the photo detector 116 outputs a reflected light intensity signal in the optical spot portion. The reflected light intensity signal is amplified by an amplifier 109 to an appropriate level, and thereafter inputted to an address decoder circuit 105 and an actuator driver circuit 110. Furthermore, concurrently with the reflection factor detection using light as heretofore described, a GMR device 117 scans the surface of the recording film 119, and conducts magnetic flux distribution detection. An output of the GMR device 117 reflecting an arrangement of record marks or reversed magnetic domains is amplified to a required level by an amplifier 111, and thereafter inputted to a decoder 106, the actuator driver circuit 110, and the address decoder circuit 105. The address decoder circuit 105 analyzes respective scanning positions from the above described reflected light intensity signal and the GMR device signal, and transmits them to a system controller 104. According to the position information of the optical spot and the GMR device 117, and a recording/reproducing request given from an external device, the system controller 104 suitably conducts control of the actuator driver circuit 110, a magnetic head driver circuit 107, and a laser driver circuit 108. According to an order given from the system controller 104, the reflected light intensity signal and the GMR device signal, the actuator driver circuit 110 drives a VCM (Voice Coil Motor) 112, a lens actuator 125, and an actuator 121 so that the optical spot may scan a central position of a desired information recording track (not illustrated) with an adequate size, or the GMR device 117 may adequately scan the central position of the desired information recording track. According to this drive signal, the VCM 112 moves a slider 118 fixed to the gimbals 124, and positions the slider 118 in an arbitrary position on the recording film 119. A recording coil 123, the SIL 122, the GMR device 117, and a base portion of the lens actuator 125 are mounted on the slider 118. The relative position relation between the SIL 122, i.e., the optical spot position and the GMR device 117 is controlled by the actuator 121. The control of the relative position between the SIL 122 and the GMR device 117 may be conducted by using any one of the following methods. The VCM 112 controls the position of the slider 118 by using the position of the optical spot as a reference, and the actuator 121 is controlled so that the optical spot and the GMR device 117 may scan the same track, or the actuator 121 is controlled so that the optical spot and the GMR device 117 may scan at intervals of a fixed number of tracks. Or the VCM 112 controls the position of the slider 118 by using the position of the GMR device 117 as a reference, and the actuator 121 is controlled so that the GMR device 117 and the optical spot may scan the same track, or the actuator 121 is controlled so that the GMR device 117 and the optical spot may scan at intervals of a fixed number of tracks. Adjusting these relative position relations may be conducted at all times, or may be conducted at predetermined time intervals.

At the time of information recording, user data 100 to be recorded is received by the system controller 104 via an interface circuit 101 for an external device. Error detection and correction information is added to the user data 100 as occasion demands, and resultant data is conveyed to an encoder 103. The encoder 103 conducts (1, 7) modulation, and then NRZI conversion on the user data 100, and generates a signal reflecting an arrangement of record marks on a medium. A recording waveform generator circuit 102 refers to this signal, and generates a control signal of a recording magnetic field and a control signal of laser light emitting intensity. Upon receiving an order from the system controller 104, the magnetic head driver circuit 107 drives the recording coils 123 according to the control signal of recording magnetic field, and generates a recording magnetic field in the optical spot portion. Furthermore, upon receiving an order from the system controller 104, the laser driver circuit 108 also drives the semiconductor laser 113 serving as a recording energy source according to the control signal of laser light emitting intensity. Laser light emitted from the semiconductor laser 113 is focused by the objective lens 126 and the SIL 122 via the collimating lens 114, the polarization beam splitter 128 and the quarter wave plate 127 to heat the recording film 119 on the substrate in a circularly polarized light state. It is now assumed that a region heated by laser light is wider than a recording magnetic field applying region. The recording film 119 is a perpendicular magnetic recording film having a magnetizing easy axis in a direction perpendicular to its film surface. It is now assumed that coercive force at the normal temperature is higher than the recording magnetic field applied from the outside, and coercive force at the time of heating using laser light at the time of recording is lower than the recording magnetic field. By controlling the heating conducted by laser light and the recording magnetic field as described later, a desired record mark can be formed on the recording film 119. Unlike the conventional technique, the transmission factor and the reflection factor, in the polarization beam splitter 127, of laser light from the light source can be made in the present embodiment equal to 100% and 0%, respectively. In the conventional technique, this transmission factor could be only approximately 70 to 80% at most. In the present invention, however, the light utilization efficiency of the light source is improved by leaps and bounds, and it becomes possible to promptly utilize a light source having a low output for recording application. Furthermore, for the same amount of light received by the photo detector 116, signal detection at a lower energy density becomes possible on the surface of the recording film 119 as compared with the conventional technique. Even in the case where the energy density is raised by, for example, shortening of the wavelength of the semiconductor laser 113, there is a relative advantage as regards the destruction of record marks on the recording film 119.

At the time of information reproduction, the surface of the recording film 119 is scanned by the GMR device 117, and magnetic flux distribution is detected. An output of the GMR device 117 reflecting an arrangement of record marks is amplified to a required level by the amplifier 111, and thereafter inputted to the actuator driver circuit 110, the decoder 106, and the address decoder circuit 105. By conducting inverse conversion of the encoder 103, the decoder 106 restores recorded data and conveys a result of the restoration to the system controller 104. The system controller 104 conducts processing such as error detection and correction as occasion demands, and delivers the reproduced user data 100 to the external device via the interface circuit 101. In the present embodiment, it is possible to transmit frequency components located near the direct current through recording and reproducing channels. Therefore, the present embodiment has such an advantage that code selection of the recording and reproducing channels which is advantageous to an increase in density becomes possible.

Figure 2:
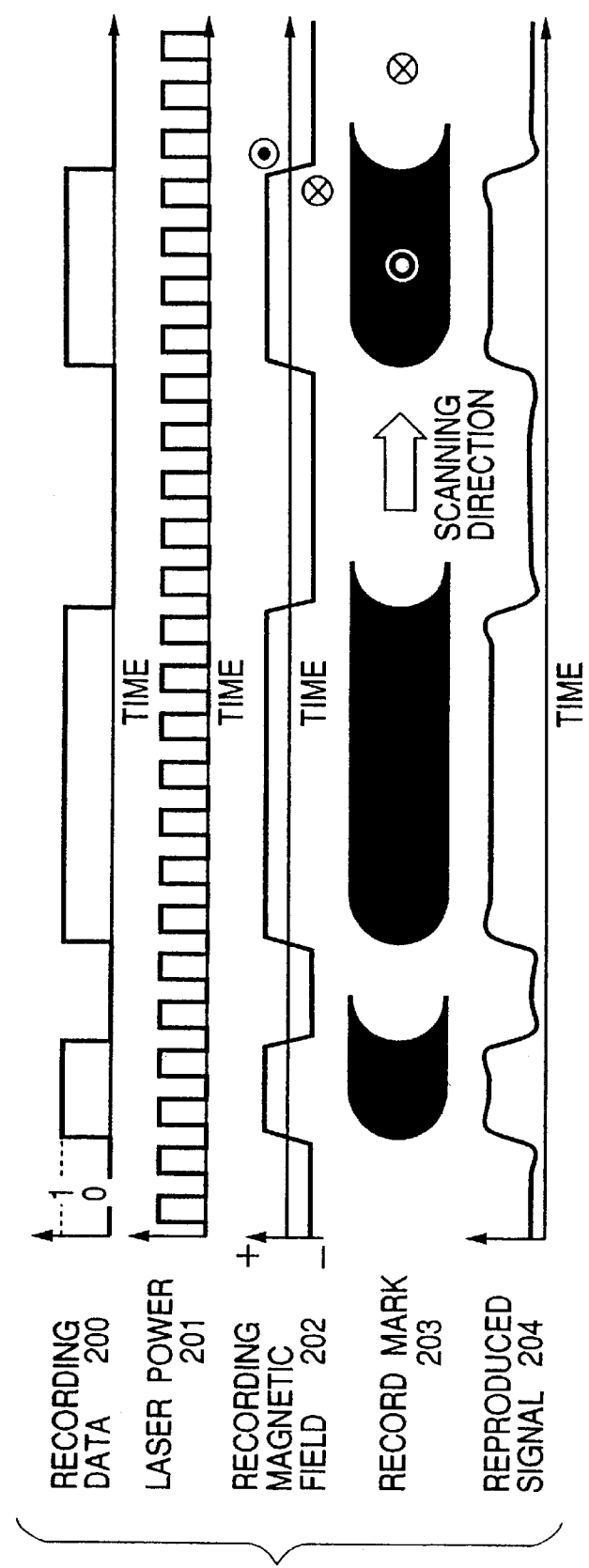
FIG. 2 is a diagram showing detailed operation of the information recording apparatus according to the present invention shown in FIG. 1.

FIG. 2 is a diagram for detailed description of operation of the information recording apparatus according to the present invention shown in FIG. 1. It is now assumed that user data is converted by the encoder at the time of recording and recording data 200 is thus obtained. The recording data 200 is conveyed to the magnetic head driver circuit via the recording waveform generator circuit, and the recording data 200 generates a recording magnetic field around an optical spot on the recording film. It is now assumed that the recording magnetic field is applied to the recording film perpendicularly. Furthermore, at the same time, the laser driver circuit drives the semiconductor laser in a pulse form synchronized to a minimum change unit (detection window width) of the record mark length, as indicated by laser light emitting intensity 201. In a region heated by an optical spot, the coercive force of the recording film decreases and becomes lower than the recording magnetic field, and magnetization of that region follows the direction of the recording magnetic field. This is a recording method called thermomagnetic recording. While the center of the heated region is being moved at fixed intervals as the recording film is scanned with the optical spot, the recording film is heated in a pulse form. Every application or irradiation of the optical pulse, therefore, the magnetization direction of a substantially circular region is determined. If the application interval of the optical pulse is gradually shortened, the substantially circular regions overlap with each other. Every application of the optical pulse, it becomes possible to determine the magnetization direction of a region similar to the crescent. A record mark 203 represents this situation. The record mark 203 shows shapes of record marks formed on the recording film in the case where recording operation represented by the laser light emitting intensity 201 and a recording magnetic field 202 is conducted. Scanning with the optical spot is conducted from the left to the right. In the case where the recording magnetic field is positive, a magnetic domain (black colored) in the upward direction as seen in the plane of the drawing is formed. In the case where the recording magnetic field is negative, a magnetic domain (white colored) in the downward direction as seen in the plane of the drawing is formed. The method heretofore described is a method widely known as magnetic field modulation recording method. In the magnetic field modulation recording method, the size of the recorded magnetic domain (magnetic wall spacing in the scanning direction) is not determined by the size of the optical spot. In formation of minute record marks, therefore, the magnetic field modulation recording method is an extremely advantageous method. At the time of information reproduction, the record mark 203 is scanned by the GMR device and a reproduced signal 204 is obtained. The reproduced signal 204 reflects the original data 200. The reproduced signal 204 is subjected to signal processing, such as amplification, equalization, binarization and decoding, as occasion demands. The user data is thus restored.

Here, an example employing thermal excitation using light to reverse the magnetization in the recording medium has been described. As for this, other excitation methods may be used.

Figure 3:
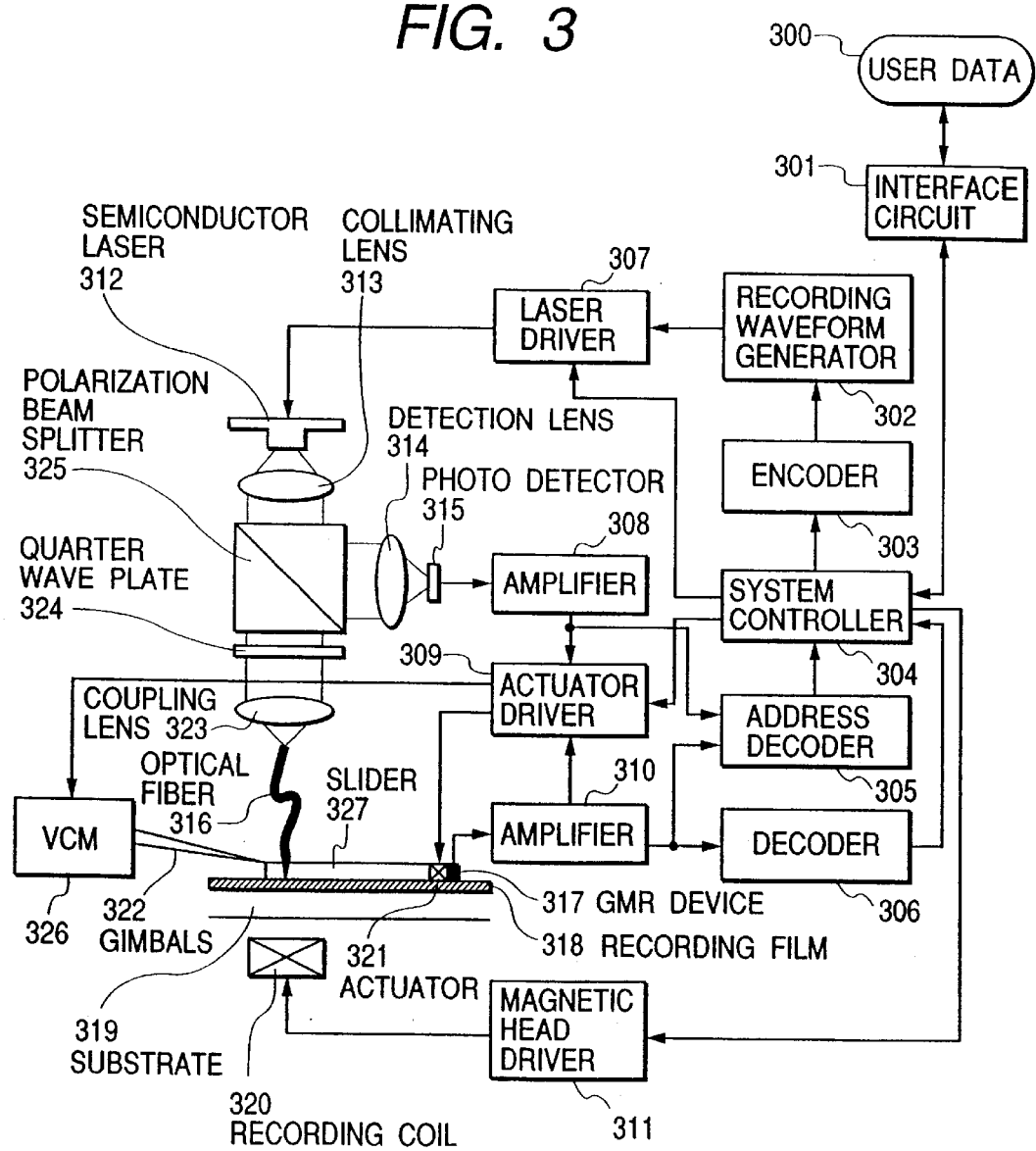
FIG. 3 is a second diagram showing an example of a configuration of an information recording apparatus according to the present invention.

FIG. 3 is a second diagram showing a configuration example of an information recording apparatus according to the present invention. Acquisition of recording and reproducing position information conducted in parallel with recording or reproducing operation is conducted as described below. Laser light emitted from a semiconductor laser 312 is converted to collimated light by a collimating lens 313. The collimated light passes through a polarization beam splitter 325, and it is converted to circularly polarized light by a quarter wave plate 324. It is now assumed that the polarization beam splitter 325 totally transmits polarized light of laser light emitted from the semiconductor laser 312. Furthermore, the emitted light is introduced into an optical fiber 316 by a coupling lens 323, and led, in a state of focused circularly polarized light, onto a recording film 318 which is formed on a substrate 319. It is now assumed that the intensity of laser light emitted from the semiconductor laser 312 is sufficiently low to such a degree as not to destroy a record mark (reversed magnetic domain, not illustrated) on the recording film 318. The tip portion of the optical fiber of the recording film side is subjected to taper working, and the aperture of the emission end is shorter than the wavelength of the semiconductor laser 312. Subsequently, reflected light from the recording film 318 passes through the optical fiber 316 and the coupling lens 323, and it is converted by the quarter wave plate 324 to linearly polarized light which is perpendicular to laser light emitted from the semiconductor laser 312. Furthermore, this reflected light is totally reflected by the polarization beam splitter 325, and focused on a photo detector 315 by a detection lens 314. Therefore, the photo detector 315 outputs a reflected light intensity signal in a portion of the recording film 318 to which light is applied by the optical fiber 316. The reflected light intensity signal is amplified by an amplifier 308 to an appropriate level, and thereafter inputted to an address decoder circuit 305 and an actuator driver circuit 309. Furthermore, concurrently with the reflection factor detection using light as heretofore described, a GMR device 317 scans the surface of the recording film 318, and conducts magnetic flux distribution detection. An output of the GMR device 317 reflecting an arrangement of record marks or reversed magnetic domains is amplified to a required level by an amplifier 310, and thereafter inputted to a decoder 306, the actuator driver circuit 309, and the address decoder circuit 305. The address decoder circuit 305 analyzes respective scanning positions from the above described reflected light intensity signal and the GMR device signal, and transmits them to a system controller 304. According to the position information of the light irradiation position and the GMR device 317, and a recording/reproducing request given from an external device, the system controller 304 suitably conducts control of the actuator driver circuit 309, a magnetic head driver circuit 311, and a laser driver circuit 307. According to an order given from the system controller 304, the reflected light intensity signal and the GMR device signal, the actuator driver circuit 309 drives a VCM 326 and an actuator 321 so that the light irradiation position may scan a central position of a desired information recording track (not illustrated), or the GMR device 317 may adequately scan the central position of the desired information recording track. According to this drive signal, the VCM 326 moves a slider 327 fixed to a gimbals 322, and positions the slider 327 in an arbitrary position on the recording film 318. The tip portion of the optical fiber 316, the GMR device 317 and the actuator 321 are mounted on the slider 327. The relative position relation between the tip portion of the optical fiber 316, i.e., the light irradiation position and the GMR device 317 is controlled by the actuator 321. The actuator 321 controls the relative position relation between the light irradiation position and the GMR device 317. The control of the relative position may be conducted by using any one of the following methods. The VCM 326 controls the position of the slider 327 by using the position of the light irradiation position as a reference, and the actuator 321 is controlled so that the light irradiation position and the position of scanning conducted by the GMR device 317 may be on the same track, or the actuator 321 is controlled so that the light irradiation position and the position of scanning conducted by the GMR device 317 may be a fixed number of tracks apart. Or the VCM 326 controls the position of the slider 327 by using the position of scanning conducted by the GMR device 317 as a reference, and the actuator 321 is controlled so that the position of scanning conducted by the GMR device 317 and the light irradiation position may be on the same track, or the actuator 321 is controlled so that the position of scanning conducted by the GMR device 317 and the light irradiation position may be a fixed number of tracks apart. Adjusting these relative position relations may be conducted at all times, or may be conducted at predetermined time intervals.

At the time of information recording, user data 300 to be recorded is received by the system controller 304 via an interface circuit 301 for an external device. Error detection and correction information is added to the user data 300 as occasion demands, and resultant data is conveyed to an encoder 303. The encoder 303 converts the user data 300 according to a predetermined conversion rule, and generates a signal reflecting an arrangement of record marks on the recording film 318. A recording waveform generator circuit 302 refers to this signal, and generates a control signal of laser light emitting intensity. Upon receiving an order from the system controller, the magnetic head driver circuit 311 drives the recording coil 320 according to the control signal of recording magnetic field, and generates a recording magnetic field in the laser light irradiation position. Furthermore, upon receiving an order from the system controller 304, the laser driver circuit 307 also drives the semiconductor laser 312 serving as a recording energy source according to the control signal of laser light emitting intensity. Laser light emitted from the semiconductor laser 312 is passed through the collimating lens 313, the polarization beam splitter 325, and the quarter wave plate 324, and then led by the coupling lens 323 and the optical fiber 316 to heat the recording film 318 on the substrate 319 in a circularly polarized light state. It is now assumed that a region heated by laser light is wider than a recording magnetic field applying region. The recording film 318 is a perpendicular magnetic recording film having a magnetizing easy axis in a direction perpendicular to its film surface. It is now assumed that coercive force at the normal temperature is higher than the recording magnetic field applied from the outside, and coercive force at the time of heating using laser light at the time of recording is lower than the recording magnetic field. By controlling the heating conducted by laser light as described later, a desired record mark can be formed on the recording film 318.

At the time of information reproduction, the surface of the recording film 318 is scanned by a magneto-resistive effect device such as the GMR device 317, and magnetic flux distribution is detected. An output of the GMR device 317 reflecting an arrangement of record marks is amplified to a required level by the amplifier 310, and thereafter inputted to the actuator driver circuit 309, the decoder 306, and the address decoder circuit 305. By conducting inverse conversion of the encoder 303, the decoder 306 restores recorded data and conveys a result of the restoration to the system controller 304. The system controller 304 conducts processing such as error detection and correction as occasion demands, and delivers the reproduced user data 300 to the external device via the interface circuit 301.

Figure 4:
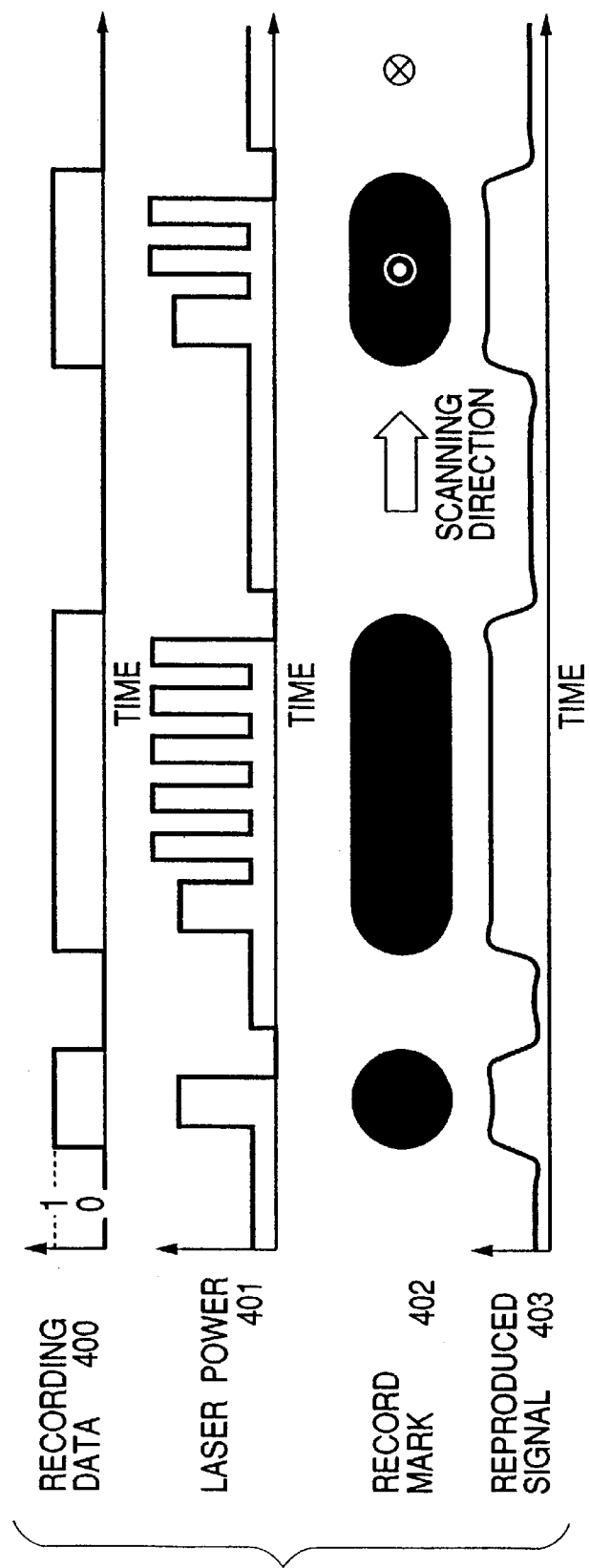
FIG. 4 is a diagram showing detailed operation of an information recording apparatus according to the present invention shown in FIG. 3.

FIG. 4 is a diagram for detailed description of operation of the information recording apparatus according to the present invention shown in FIG. 3. It is now assumed that user data is converted by the encoder at the time of recording and recording data 400 is thus obtained. The recording data 400 is conveyed to the magnetic head driver circuit via the recording waveform generator circuit. As indicated by laser light emitting intensity 401, the laser driver circuit drives the semiconductor laser according to a predetermined multi-pulse recording waveform corresponding to a record mark length. The multi-pulse recording is a publicly known technique, and described in JP-A-05-298737 and so on in detail. Therefore, its description will be omitted here. At the same time, the system controller controls the magnetic head driver circuit, and applies a recording magnetic field around a light irradiation position on the recording film 318. It is now assumed that the recording magnetic field is applied to the recording film 318 perpendicularly. Furthermore, it is assumed that the recording film has been magnetized uniformly in the downward direction as seen in the plane of the drawing prior to recording. In a region heated intensely by light emission, the coercive force of the recording film decreases and becomes lower than the recording magnetic field, and magnetization of that region follows the direction of the recording magnetic field (thermomagnetic recording). While the center of the heated region is being moved as the recording film is scanned with the light irradiation position, the recording film is heated in a pulse form. Every application of the optical pulse, therefore, the magnetization direction of a substantially circular region is determined. If the application interval of the optical pulse is gradually shortened, the substantially circular regions overlap with each other. By application of consecutive optical pulses, it becomes possible to determine the magnetization direction of an elliptical or similarly shaped region. A record mark 402 represents this situation. The record mark 402 shows shapes of record marks formed on the recording film in the case where recording operation represented by the laser light emitting intensity 401 is conducted. Scanning with the light irradiation position is conducted from the left to the right, and a magnetic domain (black colored) in the upward direction as seen in the plane of the drawing is formed. At the time of information reproduction, the record mark is scanned by the GMR device and a reproduced signal is obtained. The reproduced signal reflects the original data. The reproduced signal is subjected to signal processing, such as amplification, equalization, binarization and decoding, as occasion demands. The user data is thus restored.□

Figure 5:
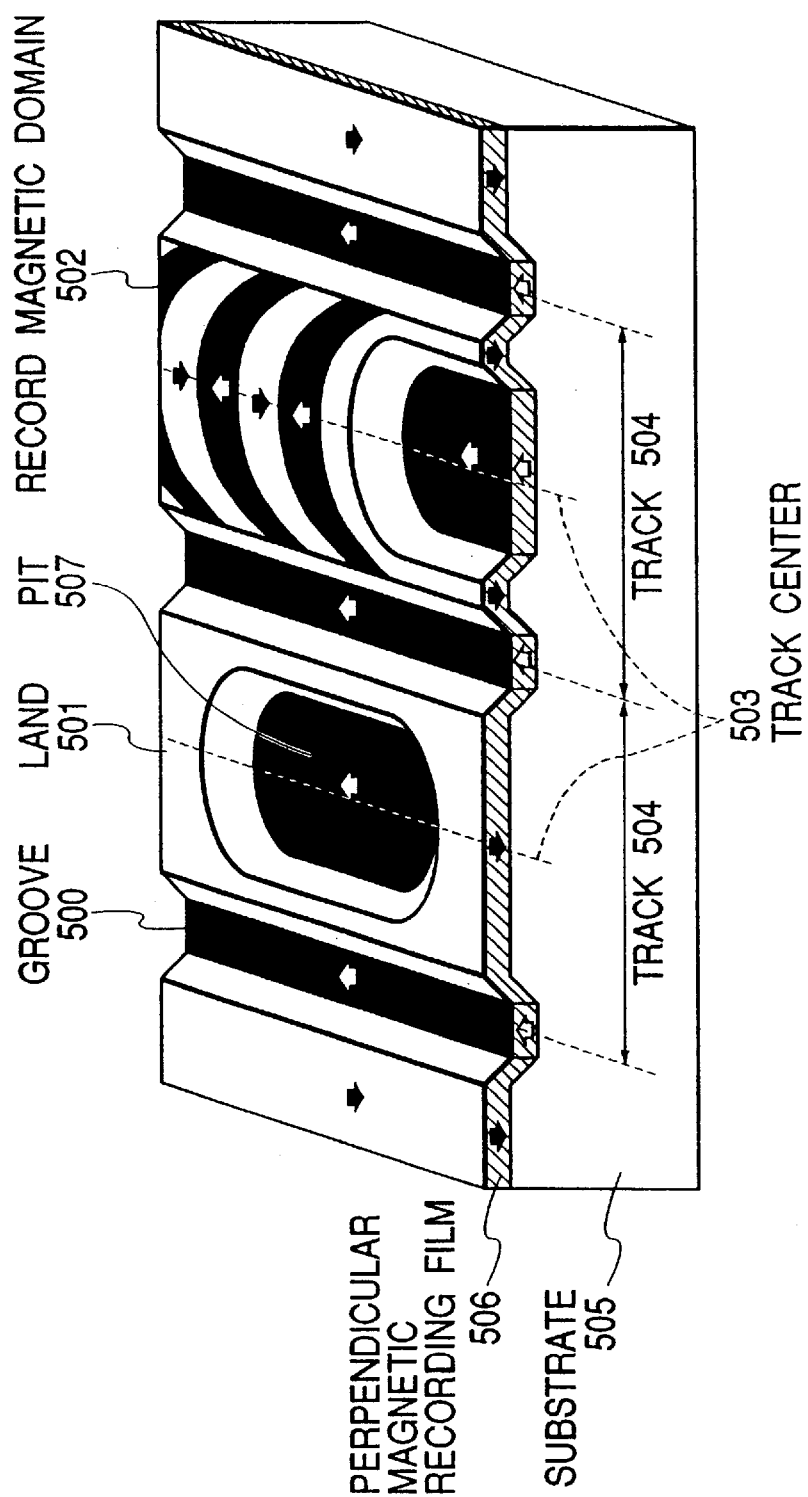
FIG. 5 is a diagram showing an example of a structure of a recording medium surface used in the present invention.

FIG. 5 is a diagram showing an example of a structure of a recording medium surface used in the present invention. As shown in FIG. 5, a perpendicular magnetic recording film 506 is formed on a substrate 505 having an embossed structure beforehand. It is conceivable that the substrate 505 takes the shape of a disk, tape, or a card, but the substrate 505 need not take a specific shape. This holds true in the ensuing description as well. As for the formation of the embossed structure in the case where the substrate 505 takes the shape of a disk or a card, there is conceivable a method such as injection molding or transfer using ultraviolet-curable resin similar to the conventional CD-ROM, DVD-ROM or the like. As for the substrate 505, there is conceivable a metal plate made of aluminum or the like, or a nonmetallic plate made of synthetic resin, carbon, or the like. However, the light transparency at the light source wavelength is not indispensable. Tracks 504 for recording user data are set at equal intervals. Each of the tracks 504 is disposed around a land 501. In boundary portions of each of the tracks 504, grooves 500 differing in height from the land 501 are formed. In the center of each of the tracks 504, a pit 507 differing in height from flat portions of the land 501 is formed. Each of the groove 500 and the pit 507 is made to have a depth equal to approximately a quarter of the wavelength of the recording energy source. In general, coercive force in the flat portions of the land 501, coercive force in the pit 507, and coercive force in the grooves 500 are different from each other because of difference in thickness of the perpendicular magnetic recording film 506, difference in stress within the perpendicular magnetic recording film 506, difference in curvature of the surface of the perpendicular magnetic recording film 506, and difference in surface roughness of the substrate 505, and the like. It is now assumed temporarily that normal temperature coercive force Hc1 at the bottom of the pit 507 and in the groove 500 is lower than normal temperature coercive force Hc2 on the flat portions of the land 501. In this case, the desired magnetic domain distribution shown in FIG. 5 is obtained by, for example, magnetizing the whole uniformly in a magnetic field which is sufficiently more intense than Hc2 and perpendicular to the film surface, and then conducting reversed magnetization partially on the bottom portion of the pit 507 and the groove 500 in a magnetic field which is opposite in direction and more intense than Hc1 and less than Hc2. Or the desired magnetization distribution shown in FIG. 5 can be implemented by heating the whole of the perpendicular magnetic recording film 506 in such a state that a fixed external magnetic field is applied to such a degree that the perpendicular magnetic anisotropy does not decrease, magnetizing the whole in a uniform direction, thereafter reversing the direction of the external application magnetic field at such a temperature that the external application magnetic field may become at least the coercive force of the bottom of the pit 507 and the groove 500 desired to reversed in magnetization and may become at most the coercive force of the flat portions of the land 501 desired not to be reversed in magnetization, and then cooling the whole. Each of colors and arrows of the perpendicular magnetic recording film 506 indicates a magnetization direction of a magnetic domain. The white color indicates magnetization (downward) directed toward the substrate as regards the perpendicular magnetic recording film 506. The black color indicates magnetization (upward) directed from the substrate as regards the recording film. However, description given here does not stipulate the relation in magnitude between Hc1 and Hc2 or the magnetization direction in the embossed structure. If there is a difference between Hc1 and Hc2, a reversed magnetic domain can be partially formed. Therefore, position information concerning the optical spot, the light irradiation position, a magnetic leakage flux detector, and so on can be acquired. Tracking servo operation is thus made possible. Furthermore, any restriction is not placed on the method for forming the reversed magnetic domain for acquiring position information, but there is no problem even if other methods (such as servo writer) are used.

Determination of the optical spot or the light irradiation position is conducted by using, for example, diffraction of light in the groove 500 or interference of light in the pit 507. In other words, as for displacements of the optical spot and light irradiation position center from the track center 503, an error signal may be generated by a push-pull method using groove diffracted light or a sample servo method using the pit 507. As for the identification of the track 504 on the recording medium, a pit 507 indicating a track identification number is formed according to a predetermined rule, and a signal is acquired by using an apparent reflection factor change caused by interference of light. The push-pull method using groove diffracted light or the sample servo method using the pit is an error signal generation method widely used in general (as described in, for example, "Optical Disk Technique" published by Radio Technique Corporation in 1989, ISBN4-8443-0198-5, p. 95). Detailed description thereof will be omitted here. Determination of the position of the magnetic flux detection means on the recording medium may be conducted by, for example, a sample servo method using a reversed magnetic domain, for example, in the pit 507 as described later. Whether the groove 500 and the pit 507 have a concave structure or a convex structure, there is no essential difference from the viewpoint of the optical phase difference. In the case where recording is conducted on the land 501, however, each of the groove 500 and the pit 507 is desired to have a concave structure with respect to the land 501 from the viewpoint of the detection sensitivity and destruction of the magnetic flux detection means. Furthermore, the reversed magnetic domain using the pit 507 may be used for recording user information itself fixed beforehand in the recording medium fabrication stage in the same way as the CD-ROM and DVD-ROM.

Figure 6:
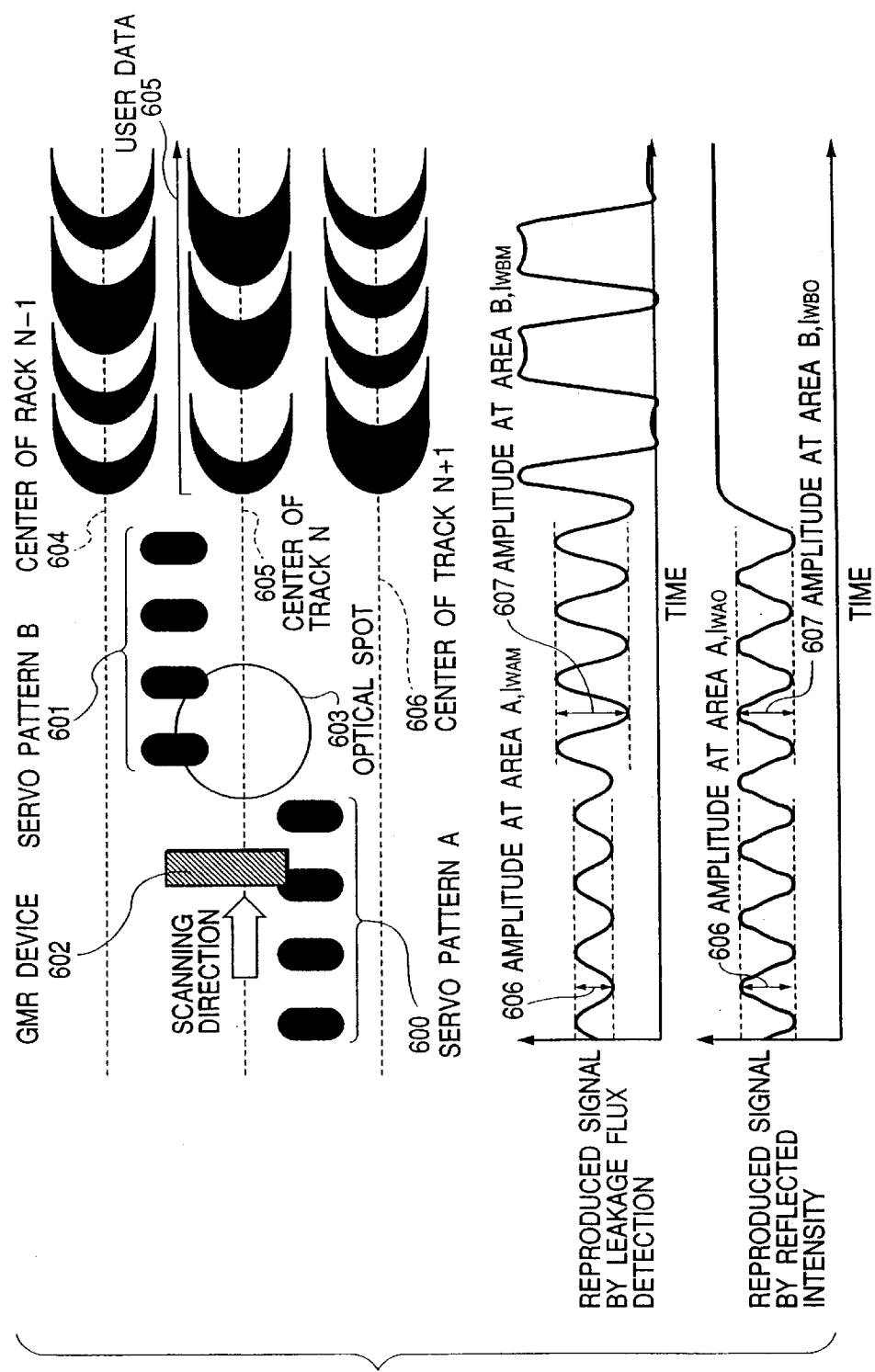
FIG. 6 is a diagram for description of an example of a tracking method for a magnetic flux detector used in the present invention.

FIG. 6 is a diagram for description of an example of a tracking method used in the present invention, and it is a schematic diagram of the perpendicular magnetic recording film on the substrate when viewed from the magnetic leakage flux reproduction side. It is now assumed that each of portions represented by black colors in FIG. 6 is magnetized upward as seen in the plane of the drawing, and each of portions represented by white colors is magnetized downward as seen in the plane of the drawing. For forming a reversed magnetic domain on the perpendicular magnetic recording film, the embossed structure and so on of the substrate described with reference to FIG. 5 is used. In other words, the reversed magnetic domain shape coincides with the unevenness distribution on the substrate surface in each of a servo pattern A 600. In positions offset from the track center for recording information inward and outward by a half track interval, the servo pattern A 600 and the servo pattern B 601 using reversed magnetic domains on the embossed structure are formed. It is now assumed that the perpendicular magnetic recording film surface is scanned from the illustrated left to the right by a GMR (Giant Magneto-Resistive) device 602 serving as the magnetic flux detection means. A reproduced signal obtained from the GMR device 602 is convolution of the sensitivity distribution of the GMR device 602 and the magnetic flux distribution on the perpendicular magnetic recording medium. For example, in the case where the scanning position of the GMR device 602 is somewhat offset on the servo pattern B 601 side, a magnitude relation IwAM<IwBM occurs between the magnetic leakage flux reproduced signal amplitude IwAM in the servo pattern A and the magnetic leakage flux reproduced signal amplitude IwBM in the servo pattern B. On the contrary, in the case where the scanning position of the GMR device 602 is somewhat offset on the servo pattern A 600 side, a magnitude relation IwAM>IwBM occurs between the magnetic leakage flux reproduced signal amplitude IwAM in the servo pattern A 600 and the magnetic leakage flux reproduced signal amplitude IwBM in the servo pattern B 601. By detecting the magnetic leakage flux reproduced signal amplitude in the servo pattern A 600 and the servo pattern B 601 and deriving the difference IwAM−IwBM, therefore, it is possible to detect a displacement value (servo signal) of the GMR device 602 from a center 605 of track N. It is possible to always scan the center 605 of track N with the GMR device 602 by forming the servo pattern A 600 and the servo pattern B 601 along tracks at predetermined intervals beforehand and forming tracking servo (sample servo) so as to make the displacement value obtained from each set of servo patterns. On the other hand, position determination of the optical spot 603 is conducted by using interference of light caused by the servo pattern A 600 and the servo pattern B 601. If the optical spot 603 passes over pits of the servo pattern A 600 and the servo pattern B 601, the light intensity of reflected light decreases in response to overlap of the optical spot with a pit. If the optical phase depth and size of each pit are provided with suitable values, then the quantity of the reflected light decreases as the overlap of the optical spot 603 with the servo pattern formed of pits is increased. For example, in the case where the scanning position of the optical spot 603 coincides with the center 605 of the track N lying just halfway between the servo pattern A 600 and the servo pattern B 601 as shown in FIG. 6, a relation IwAO=IwBO occurs between the reflected light intensity reproduced signal amplitude IwAO in the servo pattern A and the reflected light intensity reproduced signal amplitude IwBO in the servo pattern B. In the case where the scanning position of the optical spot 603 is offset toward either servo pattern, an imbalance occurs between the reflected light intensity reproduced signal amplitude IwAO and IwBO. By detecting the reflected light intensity reproduced signal amplitude in the servo pattern A 600 and the servo pattern B 601 and deriving a difference IwAO−IwBO, therefore, a displacement value (servo signal) of the optical spot 603 from the center 605 of the track N can be detected. It is possible to always scan the center 605 of track N with the GMR device 602 and the optical spot 603 by forming the servo pattern A 600 and the servo pattern B 601 along tracks at predetermined intervals beforehand and forming tracking servo (sample servo) so as to make each of displacement values obtained from each set of servo patterns.

Figure 7:
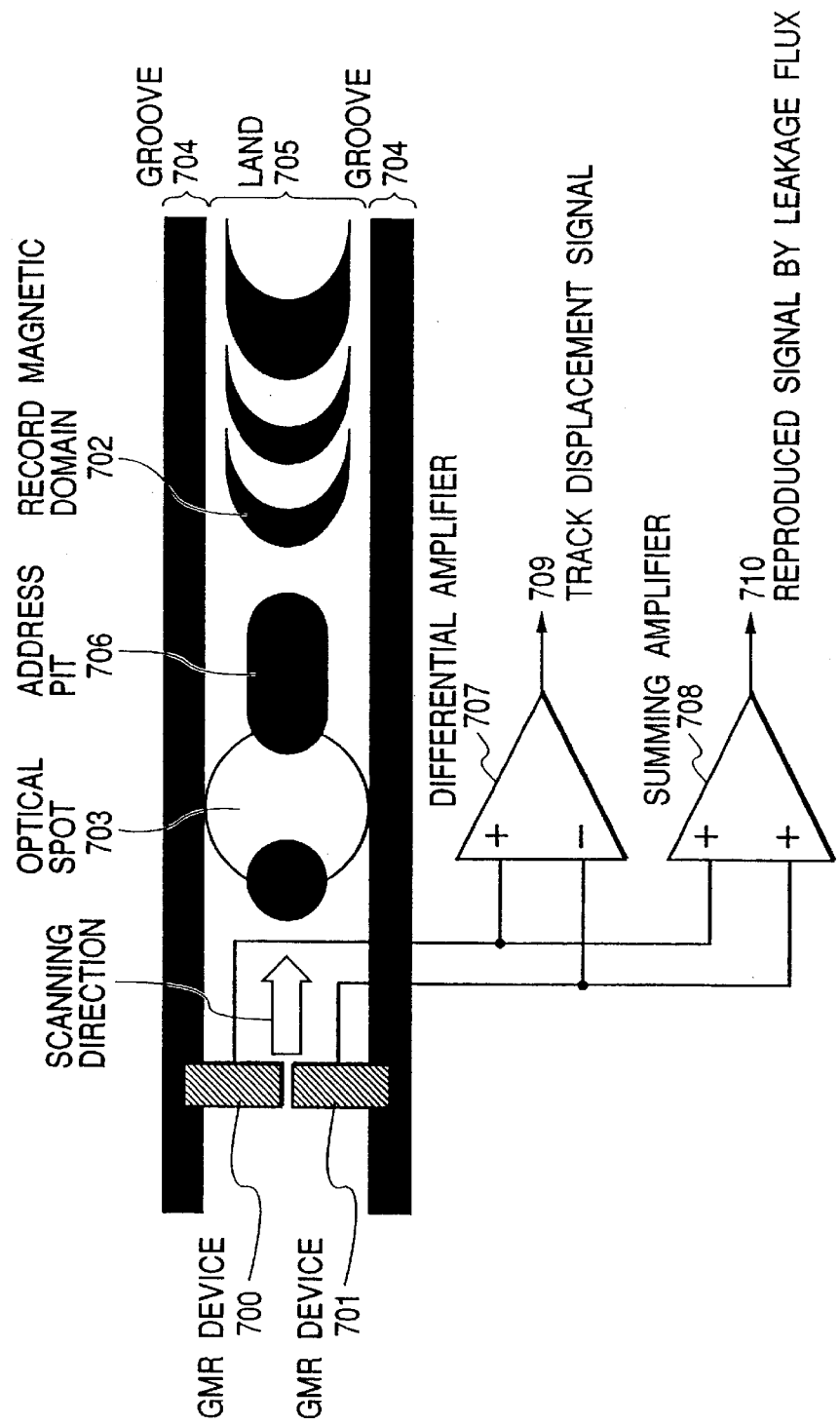
FIG. 7 is a diagram for description of another example of a tracking method for a magnetic flux detector used in the present invention.

FIG. 7 is a diagram for description of another example of another tracking method used in the present invention. It is a schematic diagram of the perpendicular magnetic recording film on the substrate when viewed from the magnetic leakage flux reproduction side. It is now assumed that each of portions represented by black colors in FIG. 7 is magnetized upward as seen in the plane of the drawing, and each of portions represented by white colors is magnetized downward as seen in the plane of the drawing. For forming a reversed magnetic domain on the perpendicular magnetic recording film, the embossed structure and so on of the substrate described with reference to FIG. 5 is used. In other words, grooves 704 are formed at both ends of a land 705 along a track so as to become lower than a surface of the land 705. The center of the track coincides with the center of the land 705. Information is recorded on the land 705. Furthermore, the magnetization direction of the grooves 704 is opposite to the erasing magnetization direction of the land 705. Furthermore, in the central part of the land 705, there is an address pit 706 which differs in magnetization direction from the land 705 and which is formed lower than the surface of the land 705. The address pits 706 are formed on the land 705 at predetermined intervals. Each of the address pits 706 holds information indicating a physical position on the recording medium, such as a track number and a sector number. The recording film surface is scanned from the illustrated left to the right with GMR devices 700 and 701 serving as magnetic flux detection means. By using two GMR devices disposed in parallel so as to be perpendicular to the track, displacement values of the GMR devices 700 and 701 from the land 705 are detected and reproduced signals are detected in the present configuration. A differential amplifier 707 calculates a difference in output between the GMR device 700 and the GMR device 701, and generates a track displacement signal 709. A summing amplifier 708 calculates the sum of outputs of the GMR device 700 and the GMR device 701, and generates a reproduced signal by leakage flux 710. Each of the reproduced signals obtained from the GMR devices 700 and 701 is convolution of the sensitivity distribution and the magnetic flux distribution on the perpendicular magnetic recording medium of that GMR device 700 or 701, as described above. In the case where the center of the set of the GMR devices 700 and 701 is displaced from the center of the land 705, the output of the GMR device which has approached rises and the output of the GMR device of the opposite side falls. As a result, the track displacement signal 709 becomes nonzero, and the direction and value of the displacement are indicated. Information from a recorded magnetic domain 702 and the address pit 706 read by the magnetic leakage flux detection means is obtained via a leakage flux reproduced signal 710. On the other hand, position determination of the optical spot 703 is conducted by using diffraction of light caused by a difference in height between the land 705 and the grooves 704. The signal detection method is a technique publicly known as the push-pull method (as described in, for example, "Optical Disk Technique" published by Radio Technique Corporation in 1989, ISBN4-8443-0198-5, p. 86). Detailed description thereof will be omitted here. Furthermore, reading the address pit 706 is conducted based upon whether the quantity of reflected light is great or small, by utilizing interference of light caused by the address pit 706.

By using the recording medium having the reversed magnetic domain structure on the embossed structure, the position information concerning the optical spot or the light irradiation position and the position information concerning the magnetic flux detector can be acquired from the same region on the recording medium as heretofore described. As a result, it is possible to improve the format efficiency of the recording medium and expand the effective storage capacity of the apparatus. For forming the reversed magnetic domains on the perpendicular magnetic recording film, the embossed structure and so on of the substrate described with reference to FIG. 5 may be used.

Figure 8:
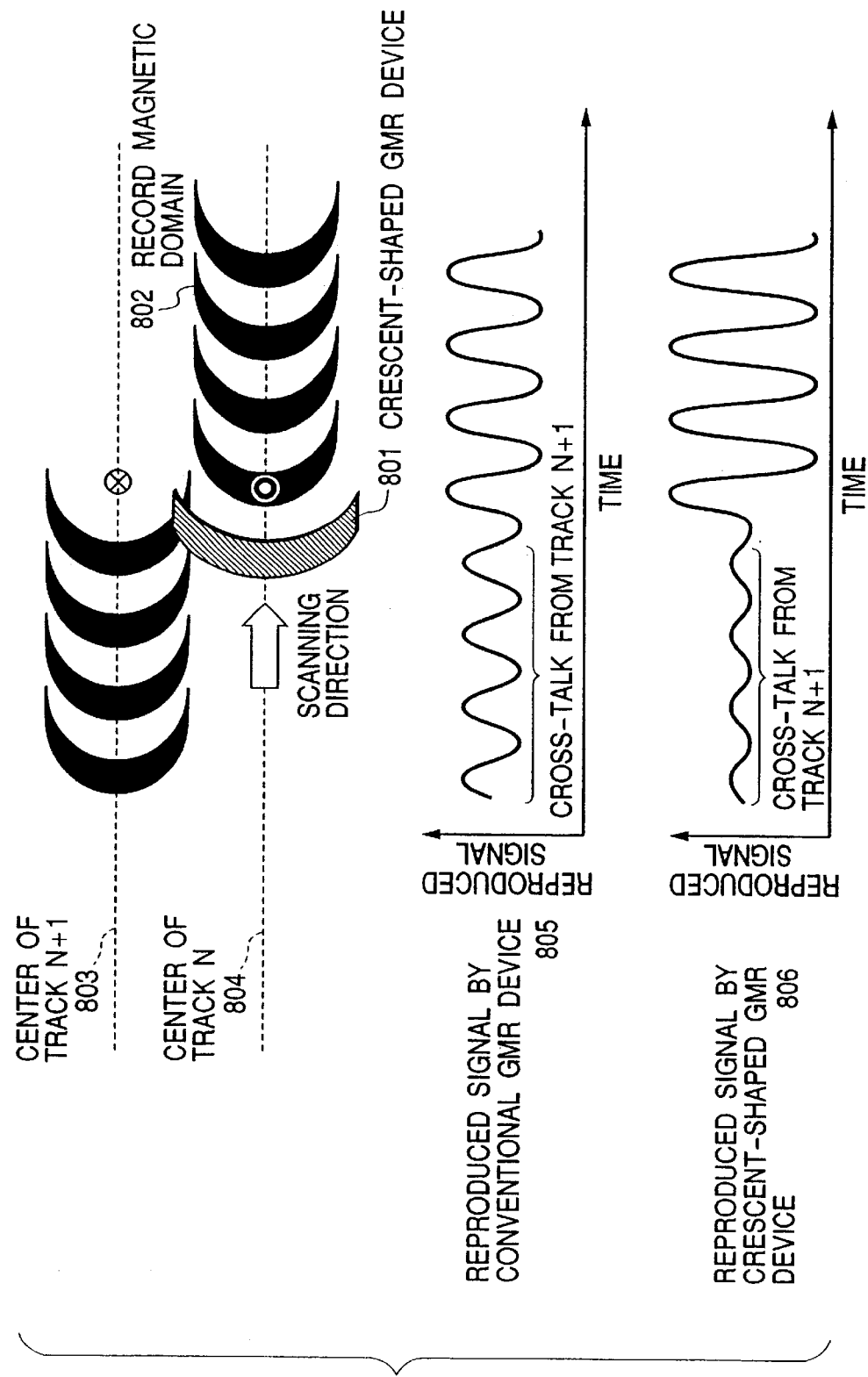
FIG. 8 is a diagram for description of a magnetic leakage flux detection means used in the present invention.

FIG. 8 is a diagram for description of the magnetic leakage flux detection means used in the present invention. It is a schematic diagram of the perpendicular magnetic recording film on the substrate when viewed from the magnetic leakage flux reproduction side. It is now assumed that each of portions represented by black colors in FIG. 8 is magnetized upward as seen in the plane of the drawing, and each of portions represented by white colors is magnetized downward as seen in the plane of the drawing. The track N 804 is scanned with the GMR device for reproduction, and information held by a recorded magnetic domain 802 is reproduced. As described above, each of the reproduced signals obtained from the GMR devices serving as the magnetic leakage flux detection means is convolution of the sensitivity distribution and the magnetic flux distribution on the perpendicular magnetic recording medium of that GMR device. In the conventional magnetic recording apparatus, the recording magnetic field applying region was substantially rectangular and the formed recorded magnetic domain was also substantially rectangular. Therefore, the sensitivity distribution of the GMR device for reproducing it was rectilinear (i.e., a ridgeline of the sensitivity distribution along the recording medium surface became substantially rectilinear when projected), and there was no problem. If reversed magnetic domains are formed by using the magnetic field modulation recording method which is advantageous to high density recording in the present invention, each of the reversed magnetic domains takes the shape of a crescent as shown in FIG. 8 and as described above with reference to FIGS. 1 and 2. If such a crescent recorded magnetic domain 802 is reproduced by using the conventional GMR device having the conventional rectilinear sensitivity distribution, then the crosstalk value from a track N+1 which is an adjacent track is comparatively large, whereas the amplitude of a signal reproduced from the recorded magnetic domain 802 formed at a high density becomes small, as represented by a signal 805 reproduced by the conventional GMR device. If the intensity of the optical pulse applied to the recording film is made large, the curvature of the crescent recorded magnetic domain decreases to some degree. However, it is not practical, in view of the problem of cross erasing with respect to adjacent tracks and deterioration of the recording film caused by intense heating of the central portion of the track. On the other hand, in the case where the crescent recorded magnetic domain 802 is reproduced by the crescent-shaped GMR device 801 of the present invention, the magnetic wall of a recorded magnetic domain on an adjacent track is substantially perpendicular to the GMR device, in an end of the GMR device as represented by a signal 806 reproduced by the crescent-shaped GMR device, and consequently the crosstalk is reduced. Furthermore, in the central part of the device, the magnetic wall of the recorded magnetic domain on the reproduced track becomes substantially parallel to the GMR device, and consequently the reproduced signal amplitude becomes large. In the case where the elliptical or similarly shaped record mark 402 as shown in FIG. 4 is reproduced, the magnetic wall of the recorded magnetic domain on the reproduced track becomes substantially parallel to the GMR device in the front end of the recorded mark (i.e., a portion scanned earlier), and consequently an effect that the reproduced signal amplitude becomes large in the front end of the record mark is obtained. In the rear end of the record mark (i.e. a portion scanned later), however, the parallelism between the GMR device and the magnetic wall of the recorded magnetic domain on the reproduced track decreases, and consequently the resolution improvement effect of the reproduced signal is not obtained. By combining the magnetic field modulation recording method with the magnetic flux detection device having crescent-shaped sensitivity distribution of the present invention as heretofore described, the signal-to-noise ratio is significantly improved in the reversed region of the recorded magnetic domain of high density as well. This is extremely advantageous in achieving a higher density and higher reliability.

Figure 9:
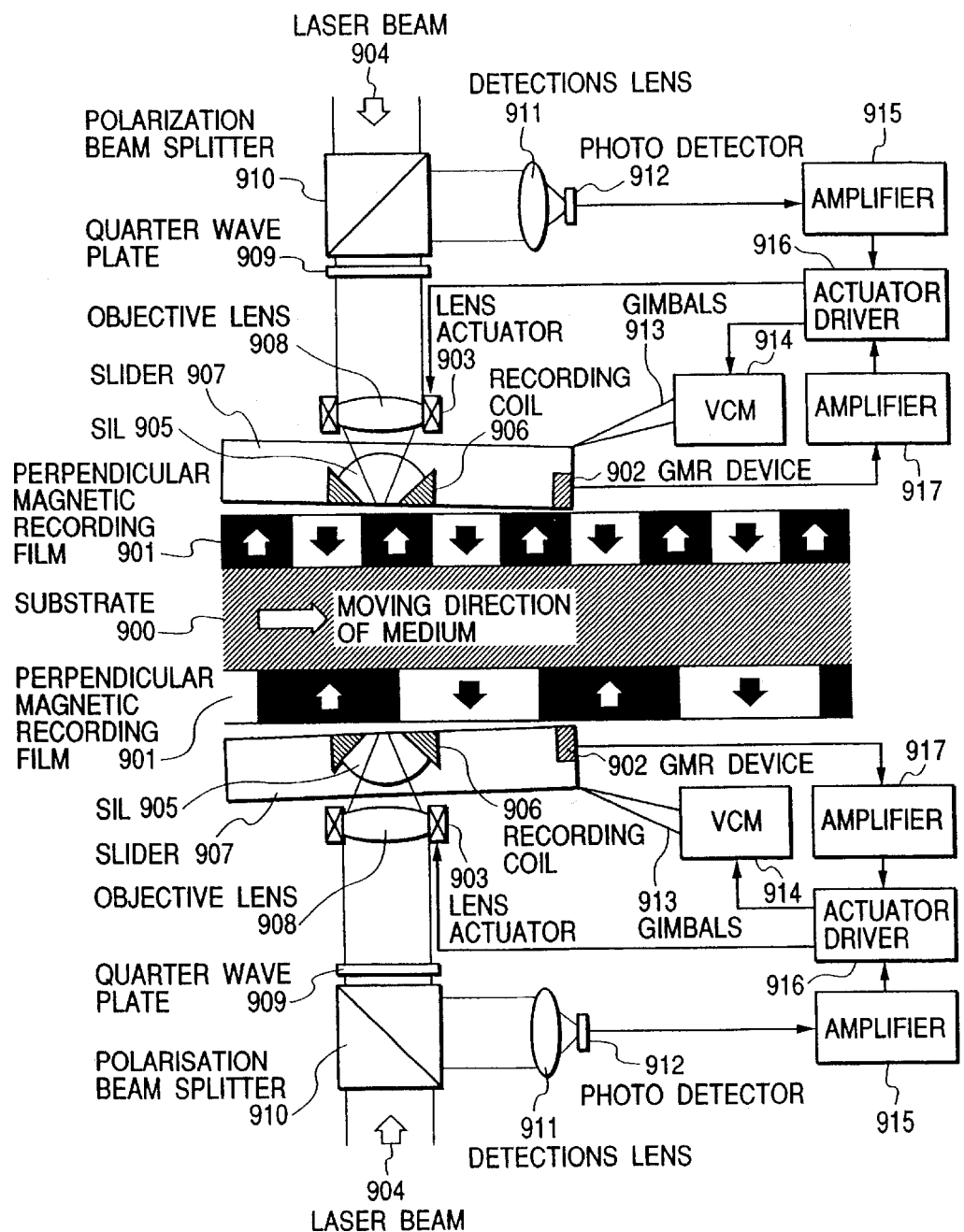
FIG. 9 is a diagram showing a somewhat detailed structure example of an information recording apparatus according to the present invention.

FIG. 9 is a diagram showing an example of a rather detailed structure of an information recording apparatus according to the present invention. It is a schematic diagram of a recording medium and a slider when viewed in the section direction. Perpendicular magnetic recording films 901 are formed on both surfaces of a substrate 900. As for the substrate 900, there is conceivable a metal plate made of aluminum or the like, or a nonmetallic plate made of synthetic resin, carbon or the like. However, the light transparency at the light source wavelength is not indispensable. It is now assumed that each of portions represented by black colors in FIG. 9 is magnetized upward as seen in the plane of the drawing, and each of portions represented by white colors is magnetized downward as seen in the plane of the drawing. On the surface of a recording medium, information recording, tracks (not illustrated) are formed in the lateral direction. The recording medium travels along the information recording tracks in a direction indicated by an arrow (to the right in FIG. 9). On the surface of the recording medium, a slider 907 having a SIL 905 and a recording coil 906 serving as recording means and a GMR device 902 serving as reproduction means mounted thereon is sliding. A laser beam 904 emitted from a light source (not illustrated) passes through a polarization beam splitter 910, and converted to circularly polarized light by a quarter wave plate 909. It is now assumed that the polarization beam splitter 910 totally transmits polarized light of the laser beam 904 emitted from the light source. Furthermore, the emitted light is focused on a perpendicular recording film 901 formed on the substrate 900 by an objective lens 908 and the SIL 905 in the circularly polarized light state. It is now assumed that the intensity of the laser beam 904 is sufficiently low to such a degree as not to destroy a recorded mark (reversed magnetic domain, not illustrated) on the perpendicular magnetic recording film 901. The recording coil 906 is disposed in a ring form around the optical spot position so as to be able to generate a recording magnetic field perpendicular to the film surface in the optical spot position. Subsequently, reflected light from the perpendicular magnetic recording film 901 passes through the SIL 905 and the objective lens 908, and thereafter it is converted by the quarter wave plate 909 to linearly polarized light which is perpendicular to laser beam emitted from the light source. Furthermore, this reflected light is totally reflected by the polarization beam splitter 910, and focused on a photo detector 912 by a detection lens 911. Therefore, the photo detector 912 outputs a reflected light intensity signal in the optical spot portion. The reflected light intensity signal is amplified by an amplifier 915 to an appropriate level, and thereafter inputted to an actuator driver circuit 916. Furthermore, concurrently with the reflection factor detection using light as heretofore described, a GMR device 902 scans the surface of the perpendicular recording film 901, and conducts magnetic flux distribution detection. An output of the GMR device 902 reflecting an arrangement of recorded marks or reversed magnetic domains is amplified to a required level by an amplifier 917, and thereafter inputted to the actuator driver circuit 916. According to the magnetic flux detection signal received from the amplifier 917, the actuator driver circuit 916 drives a VCM 914 so that the GMR device 902 may adequately scan the desired information recording track (not illustrated). According to this drive signal, the VCM 914 moves a slider 907 fixed to the tip of a gimbals 913, and positions the GMR device 902 in a desired position on the perpendicular magnetic recording film 901. A lens actuator 903 has a base portion fixed on the slider 907. The lens actuator 903 controls the relative position relation between the optical spot and the GMR device 902 so that the optical spot may scan the center position of the desired information recording track with an adequate size. In other words, as regards the size of the optical spot, the lens actuator 903 moves the objective lens 908 in the vertical direction of FIG. 9, and effects control so as to make the focus position on the perpendicular magnetic recording film 901. Furthermore, as regards the relative position relation between the optical spot and the GMR device 902, the lens actuator 903 moves the objective lens 908 in the perpendicular direction to the plane of FIG. 9, and effects control so as to make a scanning track caused by the optical spot coincide with a scanning track caused by the perpendicular magnetic recording film 901. As for the disposition order of the recording and reproducing means on the slider 907, the set of the SIL 905 and the recording coil 905 serving as the information recording means, and the GMR device 902 serving as the reproducing means are disposed in the cited order in the traveling direction of the recording medium. At the time of recording operation, recorded information can be immediately reproduced and verified without waiting rotation of the recording medium.

In the present configuration, the recording and reproducing means are disposed across each of the perpendicular magnetic recording films 901 from the substrate 900. Unlike the conventional technique, information recording/reproducing can be conducted from only one side of the substrate. As a result, it becomes possible to hold information on both surfaces of the substrate 900. Thus, the present configuration is extremely advantageous as regards the apparatus size. Furthermore, it becomes unnecessary for the substrate to have transparency for the laser beam 904. Instead of the conventional glass substrate or plastic substrate, a metal substrate, a carbon substrate, or the like can be utilized. This also results in an advantage that such a substrate material as to be advantageous as regards the mechanical characteristics and cost can be selected.

Figure 10:
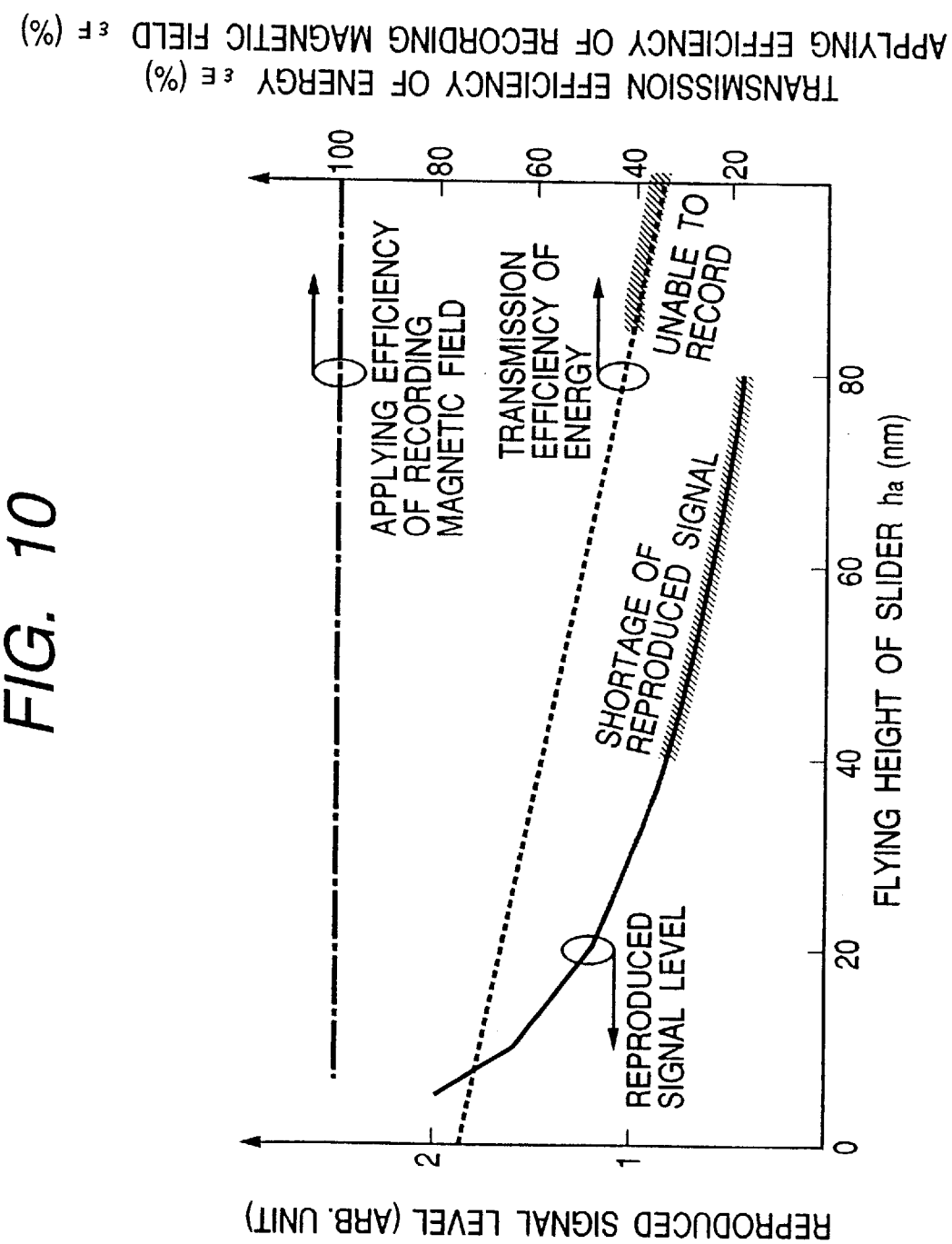
FIG. 10 is a diagram showing energy transmission efficiency, reproduced signal output, and recording magnetic field application efficiency of a recording optical system shown in FIG. 9 as functions of the flying height of slider.

FIG. 10 is a diagram showing the relations among a flying height of the slider 907 shown in FIG. 9, an energy transfer efficiency of the recording optical system, a reproduced signal output, and a recording magnetic field applying efficiency. As for the recording medium, there is used a TbFeCo amorphous perpendicular magnetic recording film having a thickness of 40 nm formed on the substrate 900 which is made of glass by using a RF sputtering method. Furthermore, on the surface thereof, a protective layer having a thickness of 10 nm made of SiN is provided. As for the recording optical system, the light source has a wavelength of 655 nm, the objective lens 908 has a NA (Numerical Aperture) of 0.6, and the SIL 905 has a refractive index of 1.5 and takes the shape of a hemisphere. First of all, record marks of a 0.2 $\mu$m period (0.1 $\mu$m length) were recorded at a linear velocity of 5 m/sec by using the magnetic field modulation recording method. The light source had optical pulse power of 18 mW and a duty ratio of 33%. The recording magnetic field was ±200 Oe. In succession, while the flying height of the slider is changed, the reproduced signal output amplitude of the GMR device 902 and the transmission efficiency of energy arriving at the perpendicular magnetic recording film 901 via the SIL 905 were measured. The reproduced signal output was represented by taking the output obtained when the flying height of the slider was 30 nm as a reference. The energy transfer factor indicates the ratio of energy obtained after being passed through the objective lens to energy which arrives at the recording film surface and which is used to form the record mark. The flying height was measured from the surface of the SiN protective film in the position of the GMR device 902 located in the rear end of the slider. The SIL 905 was disposed substantially in the center of the slider. The ratio of the flying height at the front end of the slider to that at the rear end of the slider was approximately 2:1.

When the flying height was increased, the reproduced signal output of the GMR device gradually decreased. When the flying height was at least 40 nm, a reproduced signal output having a magnitude satisfying a desired error rate could not be obtained. As the flying height was increased, the energy transmission efficiency also decreased, and recording power required to form a record mark having such a width as to yield a sufficient reproduced signal output increased. When the flying height was at least 85 nm, 30 mW which was rating of the semiconductor laser used in the light source was exceeded, and the recording operation became impossible. Furthermore, as for the recording magnetic field applying efficiency, a change was not found in the range of experiments. Typically, in the slider having a recording coil used for the conventional magnetic field modulation recording method mounted thereon, a flying height of at least several $\mu$m is ensured in order to avoid crashing into the recording medium. Subsequently, while the travel direction of the recording medium is reversed and the flying height is changed in the same way, relations among the energy transmission efficiency of the recording optical system, reproduced signal output, and recording magnetic field applying efficiency were measured. When it was attempted to realize such a state that the flying height of the GMR device is 40 nm or less in which normal recording and reproducing operation was anticipated, the rear end of the slider came in contact with the surface of the recording film, the flying became unstable, and normal reproduction could not be conducted. As regards the recording magnetic field applying efficiency, correlation with the flying height was not found, and the recording magnetic field applying efficiency was always 100%.

Putting all foregoing description together, it was necessary to dispose the SIL in front with respect to the traveling direction of the recording medium and the GMR device in the rear end, and cause the flying height of the slider to be 40 nm or less, in order to conduct stable recording and reproducing operation by using the slider having the SIL and the GMR device mounted thereon. By disposing the SIL having a wider tolerance of flying height ahead of the GMR device, there is obtained an effect that the tolerance of the flying height of the slider is widened and the stable operation margin of the apparatus is expanded.

According to the present invention, it becomes possible to conduct the recording and reproducing operation from one side of the substrate, in the information recording apparatus using a recording medium for holding information by using reversed magnetic domains on a perpendicular magnetic recording film formed on the substrate surface. As a result, the degree of freedom concerning the material of the substrate increases, and it becomes possible to employ a thin inexpensive substrate having excellent mechanical characteristics. In addition, it becomes possible to share the means for positioning the recording means and the reproducing means in an arbitrary position. Furthermore, since the focusing route of energy does not pass through the substrate, the problem of thickness error of the substrate is solved, and concurrently therewith the tolerance concerning the error of the angle formed by the substrate and the optical axis is widened. From the foregoing, high reliability of an information recording apparatus is assured, and it becomes possible to provide an information recording apparatus of large capacity with a small size and at an inexpensive cost.

What is claimed is:

1. A method for reproducing information on a recording medium, comprising steps of:

irradiating electromagnetic energy or light to the recording medium from one side with respect to the recording medium;

applying a recording magnetic field to an electromagnetic energy or light irradiated position on the recording medium from the one side of irradiating electromagnetic energy or light; and detecting magnetic leakage flux emerging from the recording medium from the one side of irradiating electromagnetic energy or light.

2. The method of reproducing information according to claim 1, further comprising the step of adjusting a relative position between a position of the electromagnetic energy or light irradiating position and a position of the magnetic leakage flux detecting position.

3. The method of reproducing information according to claim 1, further comprising the step of restoring information recorded on the recording medium from the detected magnetic leakage flux.

* * * * *